United States Patent [19]

Antuna et al.

[11] Patent Number: 5,222,360
[45] Date of Patent: Jun. 29, 1993

[54] APPARATUS FOR REMOVABLY ATTACHING A CORE FRAME TO A VANE FRAME WITH A STABLE MID RING

[75] Inventors: Eugene J. Antuna, Springdale; Donald F. Keck, Fairfield; Robert H. Roth, Cincinnati; James W. Brantley, Fairfield, all of Ohio; Thomas G. Wakeman, Lawrenceburg, Ind.; Jeffrey B. Fravel, Cincinnati, Ohio; Alan B. Corbeil, Cincinnati, Ohio; William J. Strock, Cincinnati, Ohio

[73] Assignee: General Electric Company, Cincinnati, Ohio

[21] Appl. No.: 785,365

[22] Filed: Oct. 30, 1991

Related U.S. Application Data

[63] Continuation-in-part of Ser. No. 708,263, May 28, 1992.

[51] Int. Cl.[5] ............................................. F02K 3/02
[52] U.S. Cl. .................................. 60/226.1; 60/39.31; 415/209.2
[58] Field of Search ............... 60/226.1, 226.2, 39.31; 415/189, 191, 209.2, 209.3, 209.4

[56] References Cited

U.S. PATENT DOCUMENTS

| | | | |
|---|---|---|---|
| 2,951,631 | 9/1960 | Gregory | 230/122 |
| 3,269,702 | 8/1966 | Nichols et al. | 415/209.4 |
| 3,423,071 | 1/1969 | Noren | 415/209.2 |
| 3,494,129 | 2/1970 | Krebs et al. | 60/226.1 |
| 3,528,246 | 9/1970 | Fischer | 60/226.1 |
| 3,540,682 | 11/1970 | Dibble et al. | 60/39.31 |
| 3,541,794 | 11/1970 | Johnston et al. | 60/226 |
| 3,720,060 | 3/1973 | Davies et al. | 60/226.1 |
| 3,842,595 | 10/1974 | Smith et al. | 60/39.36 |
| 3,990,814 | 11/1976 | Leone | 416/245 R |
| 4,037,809 | 7/1977 | Legrand | 244/54 |
| 4,043,522 | 8/1977 | Vetter | 244/54 |
| 4,132,069 | 1/1979 | Adamson et al. | 60/226 R |
| 4,585,189 | 4/1986 | Buxton | 244/54 |
| 4,603,821 | 8/1986 | White | 244/54 |
| 4,756,153 | 7/1988 | Roberts et al. | 60/226.1 |
| 4,934,140 | 6/1990 | Dennison et al. | 60/226.1 |

OTHER PUBLICATIONS

D. J. Lennard; "Design Features of the CF6 Engine Thrust Reverser and Spoiler"; National Air Transportation Meeting-Society of Automotive Engineers, Inc.; Apr. 21-24, 1969; pp. 1-13.

S. Kandebo et al.; "GE to Develop New Large-Thrust Engine for Commercial Aircraft"; Aviation Week & Space Technology; Jan. 22, 1991; pp. 24-28.

*Primary Examiner*—Richard A. Bertsch
*Assistant Examiner*—Michael I. Kocharov
*Attorney, Agent, or Firm*—Jerome C. Squillaro

[57] ABSTRACT

A gas turbine engine has a core frame separable from a vane frame for removably attaching the vane frame to a core structure through a mid ring. The mid ring includes an annular forward panel and an annular aft panel, each of which has a radially outer flange and a radially inner flange. The inner flanges are welded to the core frame and the outer flanges are bolted to the vane frame. A plurality of circumferentially spaced stiffeners extend between the forward and aft panels, with each of the stiffeners including a pair of stringers extending diagonally across the stiffeners. Panels may be incorporated with the stringers between the triangular shaped areas adjacent the forward and aft panels of the stiffener. The bolted connection between the mid ring and the vane frame includes a plurality of tongue and groove joints formed in the flanges of the mid ring and vane frame. The tongue and groove joints provide additional radial support for the core engine within the vane frame. Preferably, the tongue and groove joints are formed with angular sides so that conformance between the joints can be achieved by simply tightening the bolts attaching the joints. In one embodiment, the tongue and groove joints may only be used at preselected circumferential positions with the remainder of the flange connections using overlapping lap joints.

17 Claims, 5 Drawing Sheets

APPARATUS FOR REMOVABLY ATTACHING A CORE FRAME TO A VANE FRAME WITH A STABLE MID RING

This is a continuation-in-part of co-pending application Ser. No. 07/708,263 filed May 28, 1992 and assigned to the assignee of the present invention.

CROSS-REFERENCE TO RELATED APPLICATIONS

Reference is hereby made to the following copending U.S. patent applications dealing with related subject matter and assigned to the assignee of the present invention:

1. "Gas Turbine Engine Structural Frame With Multi-Yoke Attachment of Struts To Outer Casing" by Kenneth J. Lenhart et al, assigned U.S. Ser. No. 07/766,249 and filed Sep. 27, 1991.
2. "Gas Turbine Enging Structural Frame With Multi-Clevis Ring Attachment of Struts To Outer Casing" by Laura A. Fowler et al, assigned U.S. Ser. No. 07/766,255 and filed Sep. 27, 1991.
3. "Gas Turbine Engine Structural Frame With Outer Casing Flange Pockets Gripping Strut Outer Ends" by James W. Brantley, assigned U.S. Ser. No. 07/766,298 and filed Sep. 27, 1991.

BACKGROUND OF THE INVENTION

The present invention relates to apparatus for the assembly/disassembly of a turbofan gas turbine engine and, more particularly, to an apparatus for removably attaching a core frame to a vane frame with a stable mid ring.

Turbofan gas turbine engines generally include a core engine coupled in driving relationship to a forward mounted fan module. The fan module, in a high-bypass ratio engine, includes a large diameter single stage fan and a multiple stage intermediate pressure compressor or booster. The fan is surrounded by a fan casing supported by a plurality of structural members compositely referred to as a vane frame, which frame is supported on a hub frame extending from the core engine. The core engine includes a high pressure compressor, a combustor, and a multi-stage turbine for extracting energy from combustion gases exiting the combustor for driving the compressors and fan.

Mounting of such high-bypass engines on an aircraft generally requires one or more structural supports which connect the engine to a structural member, sometimes referred to as a strut or pylon, on a wing or fuselage, depending upon the mounting location. The structural supports extend through an aerodynamic cowling, sometimes referred to as a nacelle, and couple to the engine core frame. Coupling may be to the fan casing (or shroud) and to the casing surrounding the turbine. In general, some form of structural yoke is attached to the engine casing and some structural supports attach to the yoke.

As gas turbine engines have become more powerful and larger, a concern has developed with handling and transporting of such engines. In particular, engines are now being developed with fans and fan casings having diameters in the range of twelve feet. Transporting of such engines by air or ground is not practical with current commercial aircraft and over-the-road transportation guidelines. Accordingly, it is desirable to provide a method of assembly and disassembly of such engines which permits transport without exceeding aircraft or ground transport size limitations.

The problems associated with handling and transporting of such large engines extends beyond shipments to the installation, removal, and handling of the engines in aircraft servicing. It is therefore further desirable to provide a method and apparatus for servicing of such engines which overcome the problems associated with such large diameter fans.

In the aforementioned U.S. patent application Ser. No. 07/708,263, one of the connection points between the hub frame and vane frame is shown as a mid ring connection. The combined frames are attached to an aft fan case. The core structure or hub frame, out to a radius of approximately twenty-nine inches, is preferably a one piece casting. A ring with an inner radius of approximately twenty-nine inches and outer radius of approximately thirty-five inches is welded onto the hub frame casting structure making it a one piece fabricated hub structure. Bypass vanes are attached to a vane frame structure at its inner diameter ring of approximately thirty-five inch radius and extend to an outer ring of approximately sixty-three inches radius. The vane frame inner ring and the hub frame outer ring are joined to form a separable joint which defines a mid ring relative to the fan frame assembly. Consequently, this separable joint or the ring portions thereof, whether the hub frame outer ring or the vane frame inner ring, are interchangeably known as the mid ring.

The mid ring separable joint is composed of a forward flange joint and an aft flange joint. Since the forward joint and the aft joint have space limitations, they are at or nearly at the same radius. To remove the hub frame, with the core engine attached, the hub frame is required to move aft leaving the vane frame with the vane nacelle which may or may not remain with the aircraft. Consequently, the forward mid ring flange of the hub frame must pass through the aft mid ring flange of the vane frame. Accordingly, some method must be provided for accomplishing this function.

In addition, the core struts extend into the hub frame mid ring where the walls flare into flat panels. These flat panels are interrupted by large holes which help to isolate the weld joints from the rest of the structure. The flat panels, extending from the front to the aft mid ring flanges, may not be stable under expected shear forces. Thus, a more stable hub frame structure is needed. Furthermore, there is a concern that the tolerance accumulations between the front flange and the aft flange in the axial direction may not be accommodated without excessive stress being generated in the flange fasteners and the flange structure at assembly.

SUMMARY OF THE INVENTION

The above and other disadvantages of prior systems are overcome by an engine assembly having an outer and inner portion with the outer portion comprised of a fan case, and a plurality of structural and aerodynamic members, which is separable from the inner portion of the engine which extends from a spinner assembly to the primary nozzle and includes the engine components located radially inward from a thrust reverser.

More particularly, a gas turbine engine has a core frame which is separable from a vane frame to thus allow the vane frame to be removably attached to the core structure through a mid ring attachment. The mid ring attachment comprises an annular forward panel and an annular aft panel, each of which has a radially outer flange and a radially inner flange. The inner flanges are welded to the core frame and the outer flanges are bolted to the main frame. In one embodiment, a plurality of circumferentially spaced stiffeners extend between the forward panel and the aft panel. Each of the stiffeners includes a pair of stringers extending diagonally across the stiffener from flange to flange to provide a more stable stiffener for the mid ring. The space above the diagonally crossed stiffeners may be left open to provide an area in which axial adjustment of the position of the upper flanges may be made during installation in order to accommodate manufacturing tolerances. The stiffeners may be further enhanced by additional webs connected between the stiffeners and one of the forward and aft panels. Preferably, the flanges of the mid ring are attached to the flanges of the vane frame by bolts. In an illustrative embodiment, the flanges are formed such that one of the flanges has a tongue and the mating flange has a groove so that the joint formed by connection of the flanges provides maximum radial strength. Furthermore, the tongue and groove joints may be formed as wedges so that tightening of the bolts to connect the flanges serves to align the joints.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings wherein.

When referring to the drawings, it is understood that like reference numerals designate identical or corresponding parts throughout the several views.

DETAILED DESCRIPTION OF THE INVENTION

Figure 1:
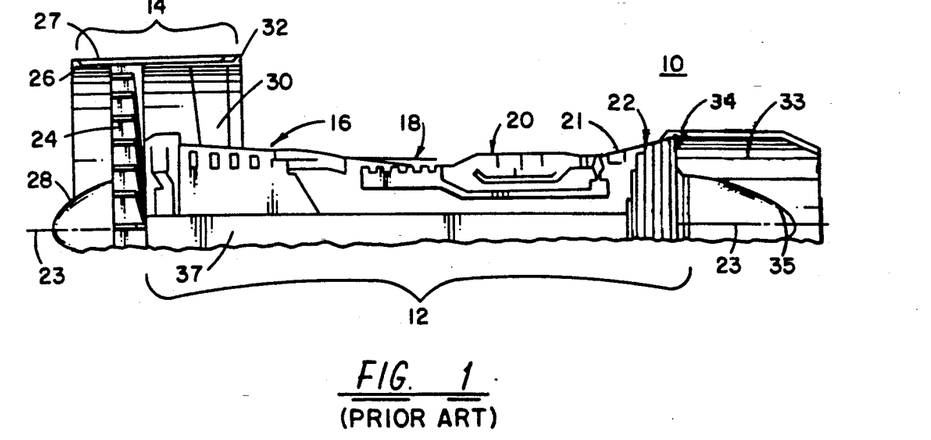
FIG. 1 is a simplified partial cross-sectional drawing of an exemplary gas turbine engine.

Referring first to FIG. 1, there is shown a partial cross-sectional drawing of an exemplary high-bypass ratio gas turbine engine 10 having a core engine portion indicated at 12 and a stator or fan portion indicated at 14. The core or engine portion 12 may be referred to as the rotor module. The rotor module or core engine 12 includes an intermediate pressure compressor or booster stage 16, a high pressure compressor stage 18, a combustor stage 20, a high pressure turbine stage 21, and a low pressure turbine stage 22 all aligned on an engine centerline 23. The core engine 12 further includes fan blades 24 and the spinner assembly 28. The fan portion 14 comprises fan cowling 27 and fan casing 26. The fan cowling 27 surrounds the fan casing 26 and radially encloses the fan portion of the engine 10.

The fan spinner assembly 28 located forward of the fan blades 24 connects to a rotor assembly 38 (shown in FIG. 2), rotor assembly 38 being a part of the core engine 12. To the aft of fan blades 24 is located a plurality of circumferentially spaced outlet guide vanes or fan frame struts 30 which are a part of the fan portion 14. The outlet guide vanes 30 connect the engine core 12 to the fan portion of the engine 10 and provide structural support. At the rear of engine 10 is located primary nozzle 33 which includes an outer member 34 and an inner member 35. A fan shaft 37 driven by turbine stage 22 extends through the engine and is coupled in driving relationship with booster stage 16. Fan shaft 37 turns fan blades 24 via fan rotor assembly 38 (shown in FIG. 2).

As will be apparent from FIG. 1, handling of the engine 10 is a major problem for very large diameter fan blades 24. While it is possible to remove the blades 24, the practice in the art is to treat the blades 24, booster stage 16, and fan case 26 as a unitary module. Some engines are constructed with a two-piece fan shaft separable aft of the booster stage 16 approximately along the line 23. These engines are identified as split fan engines. Assembly and/or disassembly of split fan engines is complicated since it is difficult to attach the fan forward shaft and the fan mid shaft properly. In such fan split methods of separating an engine, the forward module includes the fan case 26, structural outlet guide vanes 30, fan spinner assembly 28, fan blades 24, along with fan rotor 38, booster stage 16 and the forward portion of shaft 37.

Thus, it has not been practical to separate the fan module and large external components for the core engine to facilitate handling. Furthermore, it is not desirable to separate an engine where such separation includes a rotating interface since such an interface may involve bearings or critical alignments.

Figure 2:
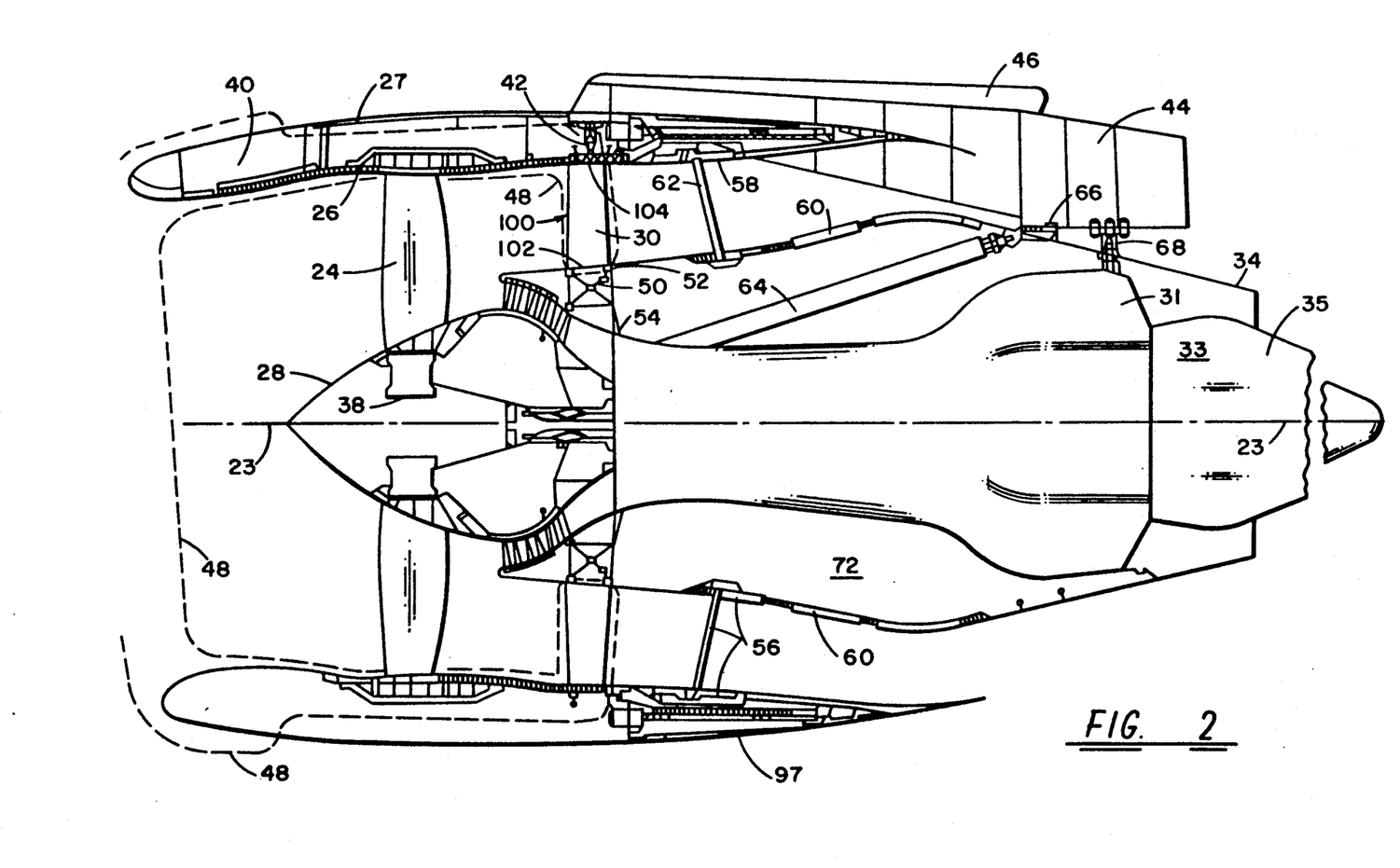
FIG. 2 is a simplified schematic side view illustration of an engine assembly incorporating an improved mid ring connection according to the present invention.

Turning now to FIG. 2, a simplified schematic illustration of the present invention's engine assembly 10, which is similar to FIG. 1, shows an inlet 40 and fan cowling 27 located at the extreme front of the engine 10, the circumferential shape of the inlet forming an air passage by which air can enter the engine. To the aft of inlet 40 is fan case 26 which may be connected to fan cowling 27. Fan case 26 surrounds the fan blades 24 which are located radially inward therefrom. To the aft of fan blades 24 lie the fan outlet guide vanes (OGV's) 30 whose distal end portions in the outward radial direction are connected to fan casing 26. In addition, the front engine mount 42 connects to the wing pylon 44 which is attached to aircraft wing 46. Broken line 48 of FIG. 2 indicates the outer portion of engine 10 and includes the inlet 40, fan casing 26 and fan outlet guide vanes 30.

Figure 3:
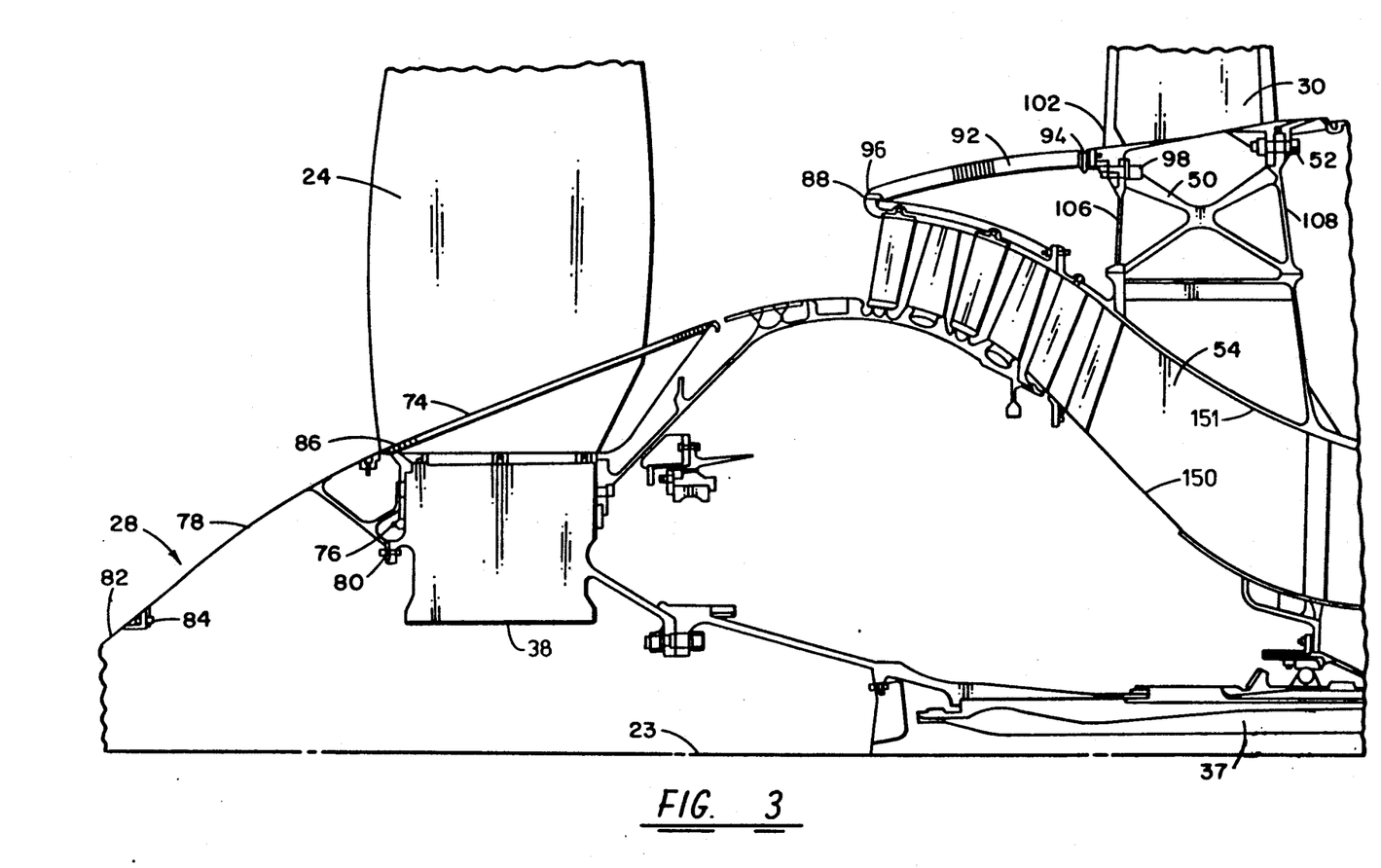
FIG. 3 is a close-up, simplified schematic illustration of the rotor and booster regions of the engine of FIG. 2 showing the mid ring connection.

The radially inward distal end portion of each fan outlet guide vane 30 is attached to fan outlet guide vane support member 50 and by means of bolts 52. Referring to FIG. 2 and FIG. 3 together, support member 50 comprises the aforementioned mid ring for connecting the vane frame to the hub frame which extends through booster casing 54. The vane frame, indicated at 100, includes the vanes 30 and their inner and outer shrouds 102 and 104. The core or hub frame comprises a plurality of struts which extend through the airflow path in casing 54 and terminate at the mid ring connection. In the mid ring area, the walls of the struts flare into flat panels attached to a forward mid ring bulkhead or panel 106 and an aft mid ring bulkhead or panel 108.

To the aft of fan cowling 27 and fan outlet guide vanes 30 is located a D-duct type thrust reverser 56 which includes a fan portion 58, a core portion 60 and links 62. The links 62 extend circumferentially around core portion 60. Located radially inward from core portion 60 of thrust reverser 56 is thrust link 64 which is attached at one end to pylon 44 at location 66, location 66 being to the aft of thrust reverser 56. The other end of thrust link 64 is connected to fan frame 54 by means of brackets (not shown) which extend circumferentially around booster case 54. To the aft of location 66 is rear engine mount 68 which connects pylon 44 to a frame 31 on core engine 12.

The inner portion 72 of the engine 10 may be defined as that portion of the engine extending from the spinner assembly 28 to the primary nozzle 33 which is located radially inward of the thrust reverser 56. The inner portion of the engine does not include the fan outlet guide vanes 30 which have been defined to be a part of the outer portion of the engine as they are inside broken line 48 of FIG. 2.

FIG. 3 is an enlarged, partial cross-sectional illustration of the fan blade and OGV attachment portion of the present invention and shows fan blade 24 connected to blade platform 74. The blades 24 are secured to rotor assembly 38 by means of anti-clank spring 76. Aft spinner 78 is connected to rotor assembly 38 by means of bolt 80 and forward spinner 82 is connected to aft spinner 78 by means of bolt 84. Pin 86 connects the blade platform 74 to rotor assembly 38.

Acoustic panels 92 are connected to the booster casing 54 by means of a tongue and groove slip joint 94. The acoustic panels are also connected to booster casing 54 by bolts 96. The fan outlet guide vanes 30 are connected to support 50 by bolts 52 and 98.

Figure 4:
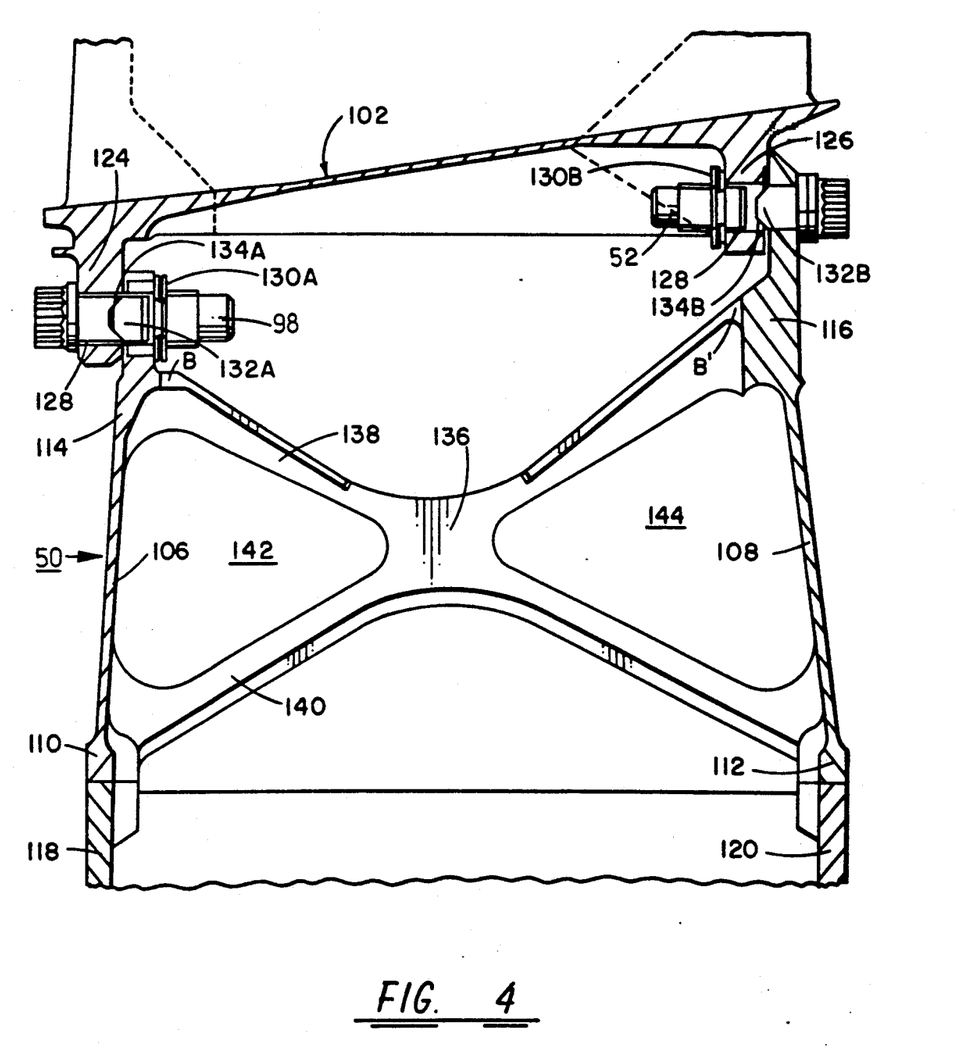
FIG. 4 is an enlarged view of one of the stiffeners used in the mid ring frame.

Turning now to FIG. 4, there is shown an enlarged and more detailed view of mid ring 50 viewed in a tangential direction. The forward panel 106 and aft panel 108 each have radially inner flanges 110 and 112, respectively, and radially outer flanges 114, and 116, respectively. The radially inner flanges 110 and 112 are cast, molded, or machined to mate with respective ones of the inner forward and aft bulkheads 118 and 120. Preferably, the flanges 110 and 112 are attached to the inner bulkheads 118 and 120 by electron beam welding. The radially outer flanges 114 and 116 are releasably attached to the inner shroud ring 102 of the vane frame by means of a plurality of circumferentially spaced bolts 52 and 98. For attachment purposes, the shroud ring 102 includes forward and aft radially inwardly extending flanges 124 and 126 having a plurality of circumferentially spaced apertures 128 for receiving the bolts 52 and 98. In a preferred form, the bolts 52 and 98 are threaded into captive nuts 130A and 130B which are attached to the inside surface of flange 114 and flange 126, respectively. The connection between the mid ring 50 and vane frame shroud 102 is designed to provide an engine quick change joint. However, the joint is required to have no motion or yielding under limit loads and no complete failure under ultimate load, i.e., a blade out at take-off. Under these conditions, there is a high radial load transmitted across the mid ring to vane frame joint. To resist such loading, the joint must not slip. However, it has been shown that friction alone in a conventional flat face lap joint is not sufficient to carry such high radial loads without slipping. The present invention overcomes this slipping problem by incorporating a tongue and groove shear joint connection in which the flange 114 and the flange 116 each include a protruding tongue indicated at 132A and 132B, respectively, with each tongue fitting into a corresponding groove 134A and 134B in flanges 124 and 126, respectively. When the flanges 114 and 116 are clamped to corresponding ones of the flanges 124 and 126, high radial shear loads are transmitted in bearing across the tongue and groove instead of through friction as in the conventional lap type flange. For the same size of bolt and bolt clamp force, this tongue and groove shear joint can withstand the design maximum radial shear loads without slippage. Furthermore, it will be noted that the tongue 132 and groove 134 are each formed with beveled sides. Preferably, the sides are beveled at 45°. This arrangement forms an angle wedge which is self aligning when the flanges are attached one to the other. The size and weight of the engine modules involved in this flange connection would make a conventional rabbeted joint extremely difficult to assemble or disassemble. However, the wedge shaped tongue and groove joint provides for ease of assembly and also assists in aligning the joint as the bolts 52 and 98 are tightened.

Figure 5:
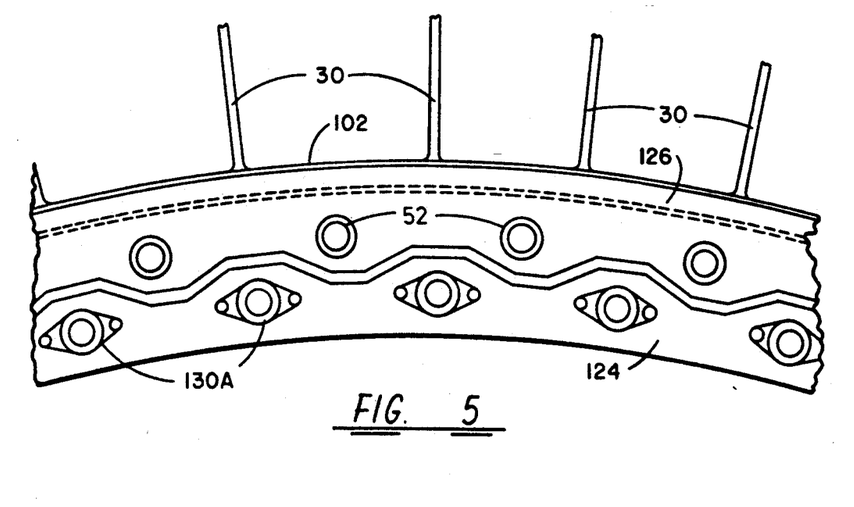
FIG. 5 is an axial view of an alternate embodiment of a mid ring in accordance with the present invention.

FIG. 4 also illustrates the radial positioning of the joint at flange 114 and the joint at flange 116. It will be noted that the flange 114 is positioned at a radius which is less than the radius of the inner end of flange 126. This arrangement allows the mid ring to be slid axially aft such that the flange 114 passes under the flange 126 to allow the core engine to be removed from the vane frame assembly. Referring briefly to FIG. 5, there is shown an axial view of an alternate embodiment of the mid ring 50 and vane frame shroud 102 in which the edges of the flange 114 and flange 126 are scalloped such that the peaks of flange 114 fit within the valleys of flange 126. This alternate embodiment allows the flange 114 to pass through the space occupied by flange 126 again permitting the mid ring to slide axially aft out of the vane frame assembly.

An analysis of the radial loading at the joints between the flanges 114, 124, and 116, 126 has shown that the maximum loading at these flanges is not uniform for the full 360° joint. Accordingly, it has been found that the use of the wedge connection, that is, the tongue and groove arrangement shown in FIG. 4, may not be required for the full 360° connection between the mid ring 50 and shroud 102. In applications in which such wedge joints are not required for the full 360°, it may be possible to reduce the mass of the flanges 114 and 116 by machining off the tongue portion 132 and utilizing a conventional overlapping lap joint at selected locations. In general, it has been found that peak loading on the mid ring occurs within preselected angular orientations at the top of the mid ring with the engine in an assembled and operative position. Accordingly, those areas of the mid ring and shroud 102 connection could be formed with tongue and groove joints while other areas of the shroud mid ring connection could utilize conventional lap joints.

In order to provide stability between the forward panel 106 and aft panel 108, the panels are interconnected by a plurality of circumferentially spaced stiffeners or shear panels 136. Each of the stiffeners 136 comprises a first flange or stringer 138 extending diagonally from flange 112 to flange 114. A second flange or stringer 140 extends diagonally from flange 110 to flange 116. The stringers 138 and 140 form an X-shaped frame structure providing stabilizing stiffness between the forward panel 106 and aft panel 108. On each side of the X-shaped structure between the adjacent panels 106 and 108, there is defined a triangular area which preferably incorporates sheet metal support panels 142 and 144. The panels 142 and 144 are desirably cast or molded in combination with the stringers 138 and 140 to form a composite structure. More particularly, in the manufacturing process, the forward and aft panels 106 and 108 may be cast integrally with the stiffeners 136 to form a circumferential segment which may be joined with additional circumferential segments to form the complete annular mid ring 50. In addition, it may be desirable to add support panels in the triangular space radially inward of the stringer 140 and stringer 138. It will be noted that the diagonal stringers 138 and 140 form an X-shaped structure that provides stability to the stiffeners which is essentially comprised of the support panels 142 and 144. The diagonal stringers 138 and 140 provide axial support to the separable joints at flanges 114 and 116. Compliance between these separable joints is accomplished by the absence of material in the space above the stringers 138 and 140 adjacent the radial inward face of shroud 102. The absence of material in space above the diagonal stringers 138 and 140 allows sufficient flexibility of the forward and aft panels 106 and 108 so that they may flex in the axial direction to accommodate a tolerance stack-up between the separable connections at flanges 114 and 116. Additional flexibility of the panel in the axial direction may also be accommodated by eliminating the shear or support panel below the stiffeners 138 and 140.

Figure 6:
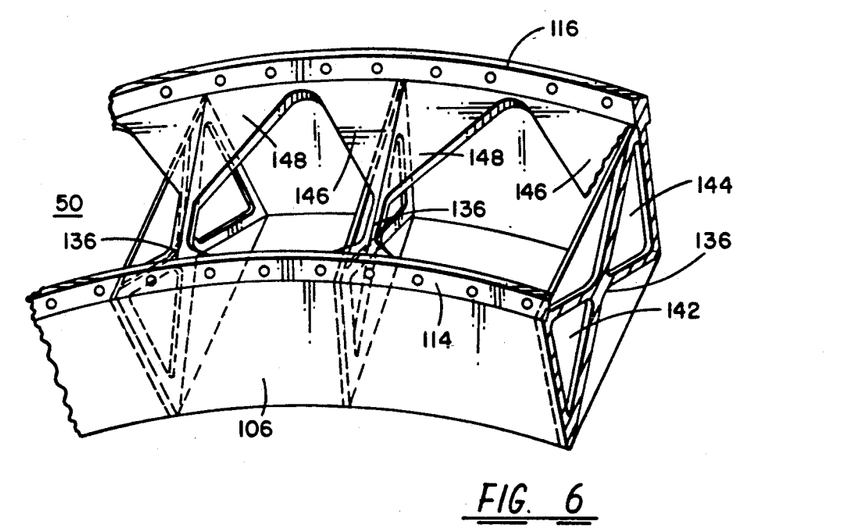
FIG. 6 is a perspective view of one of the circumferential segments of a mid ring constructed in accordance with the present invention.

Turning now to FIG. 6, there is shown a perspective view of one of the circumferential segments of mid ring 50. The forward and aft panels 106, 108 and their associated flanges 114, 116 are shown on a schematic end of this view. What is more clearly shown in FIG. 6 is the addition of circumferential webs 146 and 148 in each space between the stiffeners 136. The webs 146 and 148 are angularly oriented such that one side of each web is attached to an edge of a stringer 140 and another side of each web is attached to the aft flange 116. The webs 146 and 148 thus provide support in the circumferential direction to minimize the tendency of the stiffeners 136 to buckle or vibrate in a circumferential direction.

Figure 7:
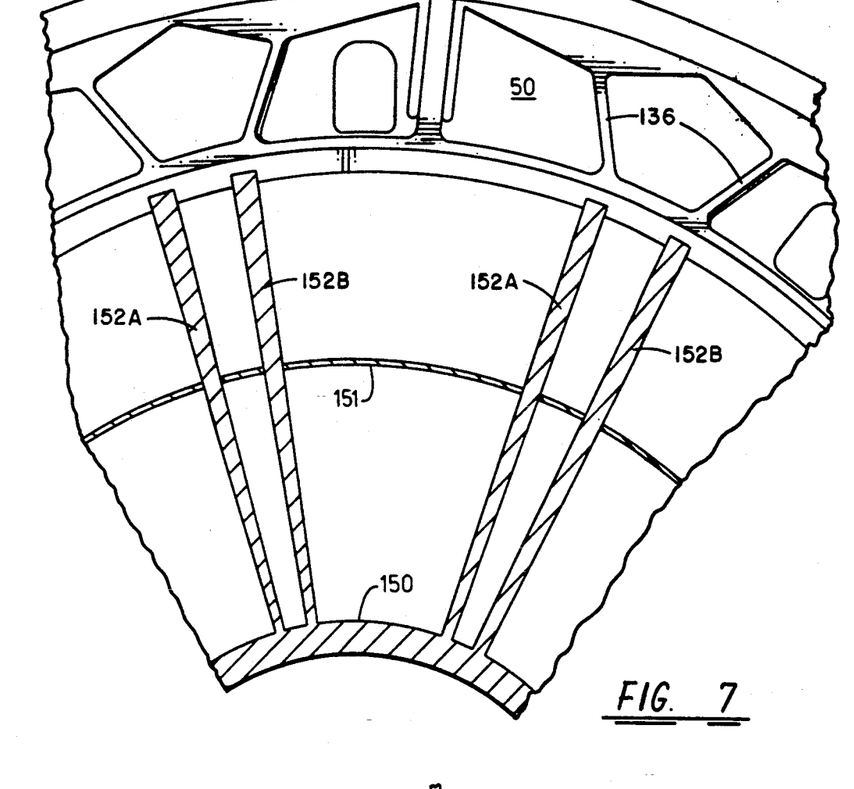
FIG. 7 is an axial view of a section of the gas turbine engine showing the struts which extend from the inner flowpath wall to the inventive mid ring.

FIG. 7 is an axial view of a section of a gas turbine engine showing the struts which extend from the core inner flowpath wall 150 through the core outer flowpath wall 151 to the mid ring 50. Taken in cross-section, it can be seen that the struts are hollow having opposite sidewalls 152A and 152B which terminate at about the point at which the inner stiffeners 136 begin within a mid ring 50. The outer stiffeners 136 occurring at each end of each mid ring segment are not aligned with struts but are rather aligned on an oblique spreading out from a radial line in order to more evenly distribute their support circumferentially.

Figure 8:
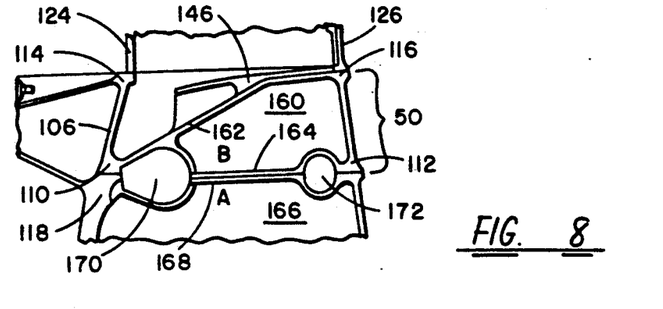
FIG. 8 illustrates an alternate form of stiffener arrangement for use in Applicant's inventive mid ring.

FIG. 8 illustrates an alternate form of stiffener structure in which the stiffener is primarily a shear panel 160 surrounded by a diagonal stringer 162 and an axially oriented stringer 164. The shear panel 160 is connected to the top of the strut wall 166 along the line 168 by electron beam welding. The hub frame remains a one piece fabricated structure with a hub mid ring 50 welded to the hub casting. The diagonal stringer 162 extends from the forward lower flange 110 to an intersection with the inner web 146 near the separable joint at flange 116. In the extreme, the flange 162 could be formed as a complete 360° shell within the mid ring 50. The diagonal connection formed by flange or stringer 162 provides axial strength to the mid ring 50. Since the panel 160 does not extend to the forward panel 106, the hub portion of the separable joint at flange 114 is relatively free to flex forward or aft allowing the hub mid ring flanges 114 and 116 to be compliant, in the axial direction, with the vane frame forward and aft flanges 124 and 126. The apertures 170 and 172 are provided to accommodate electron beam welding of the joints between flanges 110, 118, and 112, 120.

In another embodiment of FIG. 4 or FIG. 8, the diagonal stringers provide axial support to the separable joints at flanges 114 and 116. The diagonal stringers also provide stiffness to the shear or support panels connecting the forward and aft panels 106 and 108 to improve stability of the panels and stability of the overall hub frame structure. Compliance between the flange joints at flanges 114 and 116 is improved by the absence of material in the space above the diagonal stringers. This allows sufficient flexibility between the flanges 114, 116, 124, and 126 to permit flex or motion in the axial direction to accommodate any tolerance stack-up during manufacture. Furthermore, since manufacturing size limitations do not permit the entire hub frame including the mid ring connector to be cast in one piece, the hub frame mid ring 50 is cast separately in one or more pieces and a central portion of the hub frame is cast in one piece. The smaller radius circumferential weld locations at flanges 110 and 112 allow a smaller and more manageable hub casting. Furthermore, movement of the welds to smaller radius positions allows the complete mid ring sections all to be cast in a one piece ring above the circumferential welds at flanges 110 and 112. The tongue and groove shear joints also provide much higher resistance to joint slippage than conventional joints for the given size and number of bolted connections. The tongue and grove joint is also self aligning due to the wedge shaped faces on the tongue and groove joints thereby facilitating concentric assembly of very large engine modules. Circumferential variation in the type of joint, i.e., using the tongue and groove in certain locations and an overlapping lighter weight joint in other locations results in a lighter weight constructions of the mid ring assembly.

While the invention has been described in what is presently considered to be a preferred embodiment, other modifications and variations will become apparent to those skilled in the art. It is intended therefore that the invention not be limited to the specific embodiment but be interpreted within the full spirit and scope of the appended claims.

What is claimed is:

1. In a gas turbine engine having a core frame separable from a vane frame for removeably attaching the vane frame to a core structure through a mid ring attachment, an improved mid ring comprising:

an annular forward panel and an annular aft panel, each of said panels having a radially outer flange and a radially inner flange, said inner flanges being welded to the core frame and said outer flanges being bolted to the vane frame; and a plurality of circumferentially spaced stiffeners extending between said forward panel and said aft panel, each of said stiffeners comprising a first stringer extending diagonally from said radially inner flange of said forward panel to said radially outer flange of said aft panel and a second stringer extending diagonally from said radially inner flange of said aft panel to said radially outer flange of said forward panel.

2. The mid ring of claim 1 wherein said first and second stringers intersect at approximately a mid-point of each of said stiffeners forming a pair of connected, generally triangular members having two sides formed by portions of each of said stringers and a third side formed by one of said forward and aft panels, each stiffener including a pair of support panels, each one of said pair of support panels filling a respective one of said triangular members.

3. The mid ring of claim 1 wherein each of said stiffeners comprises a support panel extending from said forward panel to said aft panel, said stiffeners comprising flanges fixedly attached to said support panel.

4. The mid ring of claim 3 and including a web extending circumferentially from a circumferential edge of selected ones of said stiffeners to a mid point intermediate a pair of stiffeners, said web being attached to said stiffener along one edge and to one of said forward and aft panels along another edge.

5. The mid ring of claim 4 wherein said web is triangularly shaped.

6. The mid ring of claim 5 wherein said web extends from one of said stiffeners to said aft panel.

7. The mid ring of claim 6 wherein said mid ring is formed as a plurality of arcuate segments having a preselected number of stiffeners extending between an arcuate section of said forward panel and an arcuate section of aft said panel.

8. The mid ring of claim 1 and including a plurality of circumferentially spaced apertures formed in each of said outer flanges of said forward and aft panels for receiving bolts for attaching said mid ring to said vane frame.

9. The mid ring of claim 8 wherein said outer flange of said aft panel has a larger radius than said outer flange of said forward panel such that said mid ring is axially removable from said vane frame by axially sliding said mid-ring in an aft direction after disconnection from said vane frame.

10. The mid ring of claim 8 wherein said outer flange of each of said forward and aft panels is circumferentially scalloped to form alternately peaks and valleys, the peaks in one of said flanges being axially aligned with the valleys in the other of said flanges whereby said mid ring is axially removeable from with said vane frame.

11. The mid ring of claim 8 and including a pair of spaced circumferential flanges on a radially inner circumference of said vane frame, said flanges being positioned to mate with respective ones of said outer flanges on said mid ring, one of said spaced flanges and said outer flanges at preselected mating positions being formed with a groove and the other of said spaced flanges and said outer flanges being formed with a tongue for mating with a corresponding one of said grooves, said attaching bolts extending through said tongue and groove connection.

12. The mid ring of claim 11 wherein each of said tongue and groove are formed with angularly oriented side walls at said preselected circumferential connection points.

13. The mid ring of claim 11 wherein said spaced circumferential flanges are connected to said outer flanges with lap joints at mating positions other than said preselected mating positions.

14. The mid ring of claim 11 wherein said preselected mating positions correspond to connection points between said vane frame and said mid ring adjacent the vertical top of said mid ring when said mid ring is in an assembled position on an engine in an operative position.

15. In a gas turbine engine having a core frame separable from a vane frame for removably attaching the vane frame to a core structure through a mid ring attachment, an improved mid ring comprising:

an annular forward panel and an annular aft panel, each of said panels having a radially outer flange and a radially inner flange, said inner flanges being welded to the core frame and said outer flanges being bolted to the vane frame;

a pair of spaced circumferential flanges extending radially inward from the vane frame, said radially inner flanges being positioned to mate with respective ones of said outer flanges on said mid ring, one of said space flanges in said outer flanges being formed with a groove and the other of said space flanges in said outer flanges being formed with a tongue for mating with a corresponding one of said groove; and apertures formed through said tongue and groove connections between said flanges for receiving bolts for releasably attaching said mid ring to said vane frame.

16. The mid ring of claim 15 wherein each of said tongue and groove is formed with an angularly oriented sidewall such that tightening of said bolts aligns said tongue and groove flanges into preselected positions.

17. The mid ring of claim 16 wherein said tongue and groove connections are formed at preselected locations on said flanges, said tongue being removed at other locations wherein said flanges are connected thereby forming a lap joint.

* * * * *